INVENTOR.
JACOBUS G.C. DE GAST
BY
AGENT

United States Patent Office 3,442,560
Patented May 6, 1969

3,442,560
HYDROSTATIC BEARINGS
Jacobus Gijsbert Cornelis De Gast, Emmasingel, Eindhoven, Netherlands, assignor, by mesne assignments, to U.S. Philips Corporation, New York, N.Y., a corporation of Delaware
Filed Apr. 27, 1967, Ser. No. 634,374
Claims priority, application Netherlands, June 4, 1966, 6607799
Int. Cl. F16c 1/24, 17/16, 17/18
U.S. Cl. 308—5    8 Claims

ABSTRACT OF THE DISCLOSURE

A hydrostatic bearing assembly in which a member is supported by at least two bearing members acting on it in opposite directions. A pressurized fluid is supplied to a pressure chamber located in each of the bearing members via a housing which includes a pair of pressure equalizing chambers. The bearing assembly provides a support which substantially restricts deflection of supported member.

---

The invention relates to a hydrostatic bearing, in which a member to be journalled is supported by at least two bearing members acting upon it in opposite directions and thereby substantially eliminates deflection of the member when subjected to forces applied in a direction normal to the bearing members.

Pre-stressed hydrostatic bearings are used, for example, in machine tools in order to fulfill the more and more stringent requirements as to accuracy. In the prior art, a journalled member, when subjected to a load would deflect, thus causing the height of the gap between the lower bearing member and the member to decrease and the height of the gap between the upper bearing member and the member to increase. The decreasing height of the gap at the lower bearing member causes the pressure in the associated chamber to increase until it is in equilibrium again with the load.

It is an object of this invention to provide a bearing assembly construction in which the load variation does not influence the height of the bearing gap and hence the position of the journalled member.

A further object of the invention is provide a hydrostatic bearing assembly having at least two bearing members supporting a member in opposite directions in which variations of the load applied to the members do not influence the height of the gap between the bearing and the member.

According to the invention means are provided to increase the flow of pressurized fluid to a bearing member which supports a movable member, when the movable member is subjected to a load application in a direction normal to the bearing member. More particularly, a pair of fluid flow restrictions are formed in a housing having an internal cavity subdivided into two pressure equalizing chambers by an elastic diaphragm. Two of the cavity walls are located a small distance on either side of the diaphragm and define a space between the diaphragm and each of the two walls which acts as the fluid flow restrictions. The fluid flow restriction is thus a portion of the pressure-equalizing chamber. At least one branch of a pressurized fluid supply duct merges into each of the corresponding pressure-equalizing chambers. A fluid conductor extends from each of the pressure-equalizing chambers to the corresponding pressure chambers via the restriction.

When a load is applied to the member supported by the bearing, the pressure in one of the two pressure chambers increases and the pressure in the other chamber decreases. The pressures are transmitted to the equalizing chambers connected with the respective pressure chambers. The higher pressure in one of the equalizing chambers will cause deflection of the diaphragm. The deflection of the diaphragm will cause a decrease in the resistance provided by the restriction on the high-pressure side and the resistance of the restriction on the low-pressure side will increase. This results in a fluid flow of increasing volume to the chamber of higher pressure and in a fluid flow of decreasing volume to the chamber of lower pressure and hence an increased flow of fluid to the pressure chamber opposing the loaded member. Thus, a pre-stressed bearing having an infinitely high degree of rigidity is provided.

In an embodiment of the bearing suitable for journalling a rotary or translatory body, a bearing member is provided which has four pressure chambers evenly distributed along its inner periphery and is located concentrically with the member to be journalled. A housing having two restrictions acted upon by one diaphragm is provided for each two opposing pressure chambers.

According to a further embodiment of the invention, the housing containing the restrictions has the form of a separate unit fitting into a recess of a member to be journalled on at least two sides. This member includes a bore for introducing high-pressure fluid into the recess. The journalled member is also provided with ducts extending from the restrictions in the housing to the pressure chambers in the bearing members. A closing member is provided between the housing and the walls of the recess around said ducts.

The invention will be described more fully with reference to the several embodiments thereof illustrated in the accompanying drawing; in which.

Figure 1:
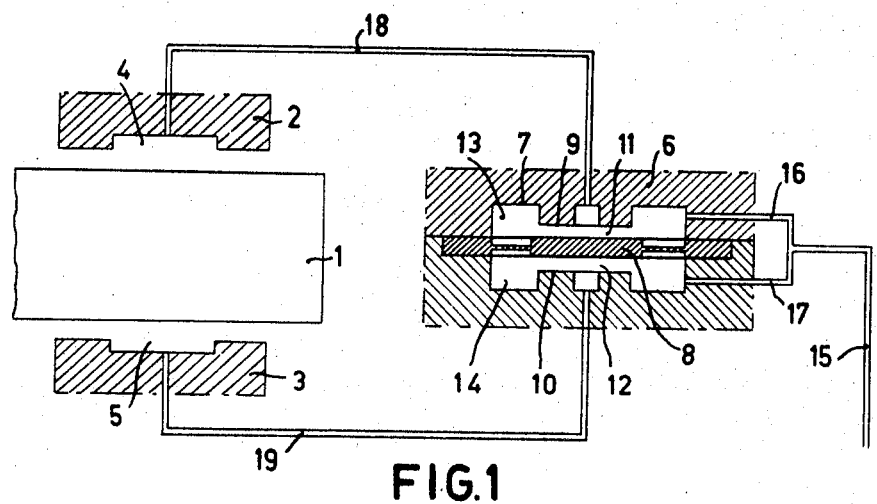
FIG. 1 shows a pre-stressed bearing for a translatory member.

FIG. 1 shows a member 1, which can be a flat plate or a shaft, supported by means of two bearing members 2 and 3 which act upon it in opposite directions. The bearing members are provided with pressure chambers 4 and 5 commonly used in hydrostatic bearings. A housing 6 encloses a substantially cylindrical cavity 7. This cavity is subdivided by a diaphragm 8 into two equal volumes which define pressure equalizing chambers 13 and 14. The spaces 11 and 12 between the diaphragm and the walls 9 and 10 each constitute a fluid flow restriction. These restrictions are surrounded by the equalizing chambers 13 and 14, respectively. The diaphragm 8 in the embodiment shown is an annular element having a relatively thick circumferential ring portion, a central disk portion and a flexible annular web which interconnects the circumferential ring and the central disk. The fluid pressure applied to the diaphragm will cause the annular web to deflect. The restriction thus defined by the space between the central disk portion of the diaphragm and the raised portion of the cavity wall is circular. The circular faces of the disk and of the cylindrical cavity are in spaced parallel relation with each other. As a result of this rotation-symmetrical construction, the path covered by the fluid particles passing through the restriction into the equalizing chamber is invariably of the same length. High-pressure liquid, for example, oil is supplied through branches 16 and 17 of a conduit 15 to each of the equalizing chambers 13 and 14 so that a variation of the pressure of the liquid to be supplied does not influence the position of the diaphragm. Conductors 18 and 19 connect the restriction with the pressure chambers in the bearing members 2 and 3.

This bearing assembly operates as follows. When the member is in the no-load state, the gaps between the member 1 and the bearing members 2 and 3 have the same height. If the member is loaded in a downward direction, the pressure in chamber 5 increases, whereas the pressure in chamber 4 decreases. These pressures propagate to the spaces 11 and 12 which constitute the restriction. As a result of which the diaphragm 8 deflects towards the wall 9. A state of equilibrium of the diaphragm is attained when the force resulting from the pressure difference across the diaphragm is in equilibrium with the resultant force caused by the elastic deflection of the diaphragm. The fluid flow resistance provided by the restriction 12 decreases, due to the increase in cross sectional area and that of gap 11 increases due to a corresponding decrease in cross sectional areas, such that per unit time a larger quantity of fluid flows through gap 12 to chamber 5. If suitable values are chosen for the rigidity of the diaphragm 8 and for the resistance of the restriction the height of the bearing gaps on either side of the supported member 1 will not vary when the member is subjected to loading. Thus, a substantially infinite degree of rigidity for the bearing is obtained. Rigidity is defined as the load variation divided by the variation of the bearing gap height. However, the volume of the fluid flowing from the chamber 5 adjacent the bearing is larger when the member 1 is in the loaded state than when the member 1 is in the unloaded state so that in the loaded state of the member the fluid pressure in the chamber 5 is invariably higher and the fluid pressure in the chamber 4 is invariably lower than in the unloaded state of said member. Consequently, a deflection of the diaphragm 8 is retained in order to obtain a larger height of the space 12 and a smaller height of the space 11. The position of the diaphragm will not be influenced by variation of the supply pressure.

The rigidity provided by the bearing is dependent on the shape of the restriction, the rigidity of the diaphragm, the height of the bearing gap and the pressure of the supply fluid. The displacements of the diaphragm may be small since the resistance of the restriction varies by the third power of the height of the space defining the restriction. Assuming a given diaphragm rigidity and restriction shape the rigidity of the bearing will be controlled by the bearing gap height and the fluid pressure. This implies that the pressure of the liquid supplied may be low and the height of the bearing gap may be high without adversely affecting the degree of rigidity of the bearing. Since this permits relatively large bearing tolerances the bearing can be manufactured in a simple and economical manner.

Figure 2:
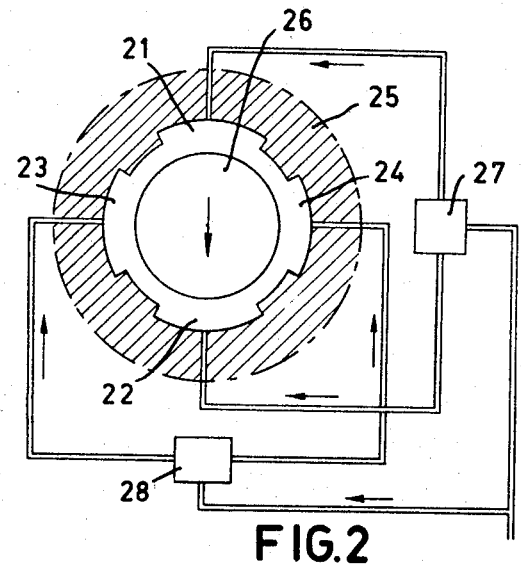
FIG. 2 shows a bearing for a rotary or translatory journal.

FIG. 2 shows an embodiment of the bearing for a rotary or translatory journal 26. The bearing member comprises four chambers 21–24 which are at an angle to each other of 90°. The pressure of the liquid in the chambers 21 and 22 determines the dimensions of the restriction controlled by means of a diaphragm, the restriction and diaphragm being diagrammatically indicated by 27 and being constructed in the same manner as the corresponding members shown in FIG. 1. The chambers 23 and 24 constitute a cooperating pair of chambers and are both connected to restriction controlled by means of a diaphragm, diagrammatically indicated by 28. The operation of the hydrostatic bearing of FIG. 2 only differs from that of the bearing of FIG. 1 in that the journal 26 is now supported by the bearing on all sides.

Figure 3:
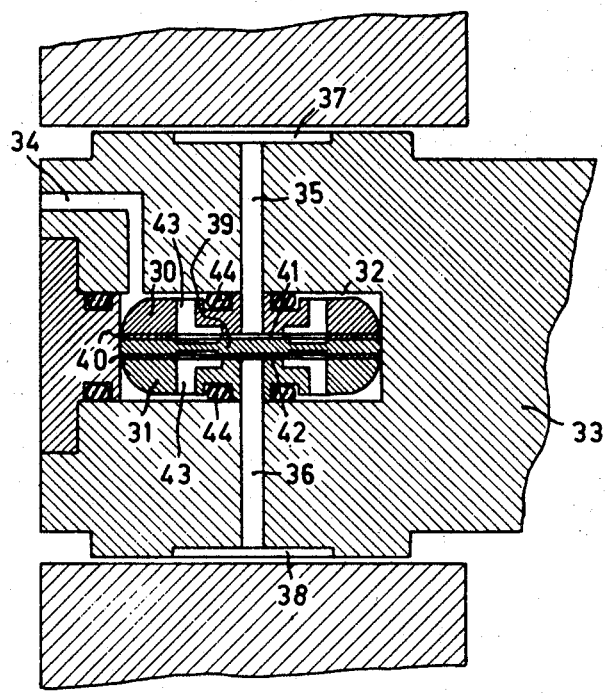
FIG. 3 shows an alternative embodiment of the bearing for a translatory member.

In FIG. 3, the housing 30, 31, containing the restriction 41 and 42, is inserted into a recess 32 of member 33. A duct 34 supplies the housing with a high-pressure fluid; ducts 35 and 36 are connected with the restriction 41 and 42 and the pressure chambers 37 and 38 respectively. The diaphragm 39 is clamped at its periphery in the housing 30, 31. Annular spacer foils 40 for adjusting the gap height of the restriction 41 and 42 in the unloaded state are interposed between the housing and the diaphragm.

The high-pressure fluid flowing through duct 34 surrounds the two housing members 30 and 31 and thus forces the housing members against each other. The fluid enters the housing through apertures 43 and flows through the restriction 41 and 42 to the pressure chambers 37 and 38. The pressure in the chambers 37 and 38 determines the height of the space defining the fluid flow restriction, in the same manner as described with reference to FIG. 1. Sealing members 44 prevent the high-pressure fluid from leaking into the pressure chambers.

The above cited embodiments are intended as exemplary only, and while I have described my invention with a specific application and embodiment thereof, other modifications will be apparent to those skilled in the art without departing from the spirit and scope of the invention as defined by the appended claims.

What is claimed is:

1. A hydrostatic bearing assembly for supporting a movable member comprising at least one pair of bearing means, each of said bearing means being in opposed spaced relationship of the other of said bearing means with said movable member positioned therebetween; each of said bearing means including a pressure chamber means with said pressure chamber means being in confronting relation to said member; at least one housing means, said housing means including internal wall surfaces defining an internal cavity, wherein two of said wall surfaces are in opposed spaced relationship; an elastic diaphragm means positioned between said wall surfaces thereby dividing said cavity into two equalizing chamber means; a pair of fluid flow restriction means, each restriction means being adjacent said diaphragm and positioned within one of said equalizing chambers; a plurality of fluid conductor means, each of said conductor means interconnecting one of said pressure chamber means and one of said fluid flow restriction means; and fluid supply means connected to said equalizing chamber means for introducing pressurized fluid into each of said equalizing chambers whereby said fluid then passes into one of said pressure chambers via one of said fluid flow restriction means.

2. A hydrostatic bearing assembly according to claim 1 wherein the said cavity in said housing is substantially cylindrical in shape, and each of said fluid flow restriction means comprises a raised annular portion of said wall surface in opposed parallel relation with said diaphragm means.

3. A hydrostatic bearing assembly according to claim 1 wherein the housing means is positioned internally of said movable member.

4. A hydrostatic bearing assembly according to claim 2 wherein the said diaphragm means comprises an annular element having a relatively thick circumferential ring portion, a central disk portion and a flexible annular web interconnecting said ring portion and said disk portion, with said central disk portion having a diameter substantially equal to said raised annular portion of wall surface and being positioned opposite thereof.

5. A hydrostatic bearing assembly according to claim 4 wherein the housing means is positioned internally of said movable member.

6. A hydrostatic bearing assembly for a journal member capable of translational and rotational motion comprising a tubular bearing means concentric with said journal, said bearing means having an even numbered plurality of pressure chamber means equally spaced around the inner periphery of said bearing means, wherein opposing pressure chamber means constitute cooperating pairs, a plurality of housing means equal in number to the number of said pairs of cooperating pressure chamber means, each of said housing means having a substantially closed internal cavity therein, wherein two of the wall surfaces defining said cavity are in opposed parallel spaced relation, an elastic diaphragm means parallel with said wall surfaces dividing said cavity into two equalizing chambers, a pair of fluid flow restriction means for each housing means, one each positioned in each of said equalizing chambers, a plurality of pairs of fluid conductor means corresponding in number to the number of pairs of pressure chamber means, each of said pairs of fluid conductor means interconnecting a pair of said pressure chamber means with a pair of said fluid flow restriction means, wherein one fluid conductor means interconnects one pressure chamber means and one fluid flow restriction means, and a plurality of fluid supply means, corresponding in number to the number of housing means, each of said fluid supply means being connected with one of said housing means and adapted to introduce pressurized fluid into each of said equalizing chambers in said housing, whereby said fluid then passes into said fluid flow restriction means and into said interconnected pressure chamber thereby supporting said journal member.

7. A hydrostatic bearing assembly according to claim 6 wherein the said cavity in said housing is substantially cylindrical in shape, and each of said fluid flow restriction means comprises a raised annular portion of said wall surface in opposed parallel relation with said diaphragm means.

8. A hydrostatic bearing assembly according to claim 6 wherein the said diaphragm means comprises an annular element having a relatively thick circumferential ring portion, a central disk portion and a flexible annular web interconnecting said ring portion and said disk portion, with said central disk portion having a diameter substantially equal to said raised annular portion of wall surface and being positioned opposite thereto.

References Cited
UNITED STATES PATENTS

| | | | |
|---|---|---|---|
| 1,150,485 | 8/1915 | Bentley | 308—122 X |
| 3,251,633 | 5/1966 | Mohsin | 308—5 |
| 3,271,086 | 9/1966 | Deffrenne | 308—5 |

FOREIGN PATENTS 1,142,912  9/1957  France.

EDGAR W. GEOGHEGAN, *Primary Examiner.*

LUCIOUS L. JOHNSON, *Assistant Examiner.*

U.S. Cl. X.R.

308—122, 9